July 1, 1930. P. M. F. DUGIT ET AL 1,769,422
ELECTRICAL MEASURING APPARATUS
Filed Jan. 13, 1928 3 Sheets-Sheet 2

Inventors
Maurice Dugit and
Amable Pierre Jean-Marie Houlhoux
By B. Singer, Atty.

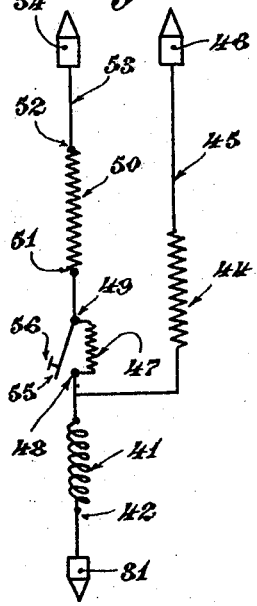
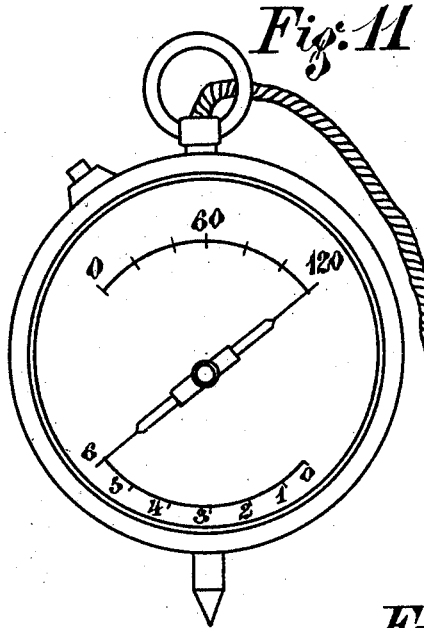
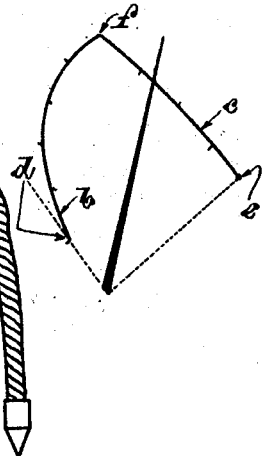
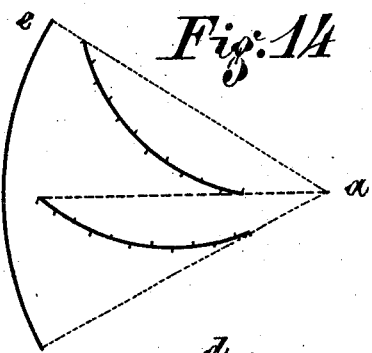
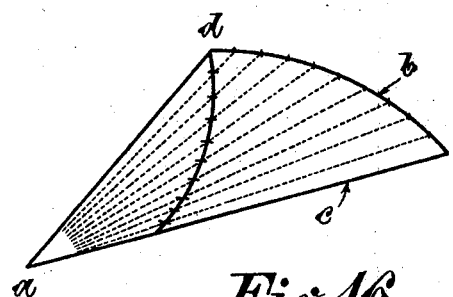
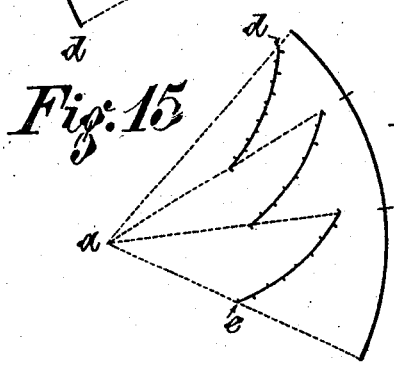
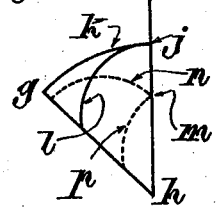

Patented July 1, 1930

1,769,422

UNITED STATES PATENT OFFICE

PIERRE MAURICE FRANCOIS DUGIT, OF LYON, AND AMABLE PIERRE JEAN-MARIE FOULHOUZE, OF ST.-ETIENNE, FRANCE

ELECTRICAL MEASURING APPARATUS

Application filed January 13, 1928, Serial No. 246,625, and in France January 17, 1927.

This invention relates to improvements in electric measuring apparatus of the type having a single variable, for ammeters, voltmetres and the like.

Three separate considerations have to be considered.

1. Scales having equidistant readings,
2. Amplifications of the readings,
3. An indicating arrangement for multiple reading with distinct scales.

The choice of portions of the integral curves as points on the equidistant scale will allow for the employment of equidistant points.

The amplification of the readings is obtained by employing a series of auxiliary curves of the same nature.

The third consideration is obtained by the combination in one apparatus of indicating systems with independent pointers affixed to the same spindle, each pointer corresponding to a different scale of different maxima.

The invention will be described with reference to a portable voltmeter having three scales making it possible to readily indicate separately voltages of three very different ranges.

The invention will be described with reference to the accompanying drawings:—

Figs. 9 and 10 are diagrammatic views of modified circuits.

Fig. 11 shows an arrangement employing only two scales.

Fig. 12 shows the plotting of a curve for obtaining scale readings having equidistant points.

Fig. 13 shows diagrammatically a scale arrangement combining two curves of different forms.

Figs. 14 and 15 are modified arrangements on a circular dial for combining a series of different curves having equidistant points.

Fig. 16 shows diagrammatically a scale utilizing a main curve and a series of auxiliary curves each having equidistant points.

Figs. 17 and 18 show curves for a particular instrument in which the variations are proportional to the angular displacements of the pointer, a portable voltmeter taken as an example is of the pocket type used for testing the cells of accumulators or batteries.

The instrument is constructed with three scale calibrations for example 0 to 120. 0 to 6, 0 to 2 volts so that the voltage of different portions of a battery can be tested as well as that of individual cells.

Figure 1:
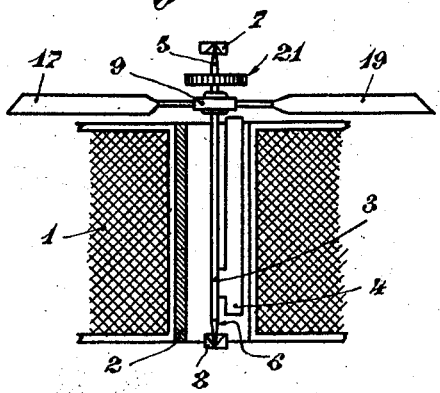
Fig. 1 is a diagrammatic section of an electromagnetic voltmeter having three scale ranges.

The voltmeter construction is shown in Fig. 1. The apparatus comprises a coil 1 inside which is mounted a soft iron core 2 stationary with respect to the coil. A spindle 3 is also arranged within the coil 1 carrying a soft iron armature 4 pivoted at two points 5 and 6 mounted in bearings 7 and 8 respectively.

Figure 2:
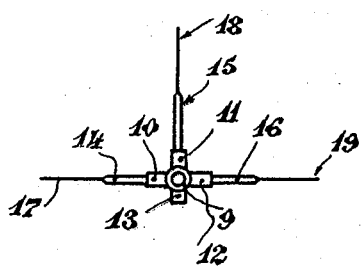
Fig. 2 is a detail view of the pointers.

The spindle 3 carries at its upper end a bracket 9 having four short arms 10, 11, 12 and 13 arranged at right angles to each other (Fig. 2). Pointers 14, 15 and 16 are mounted on the arms 10, 11 and 12 respectively the pointers being formed at the ends 17, 18 and 19 with arrows or flattened edges or raised ends perpendicular to a dial 20 and a counterweight on the arm 13.

A spiral spring 21 (Fig. 1) returns the pointers to the zero position and during operation balances the electromagnetic force between the two masses of soft iron 2 and 4.

Figure 3:
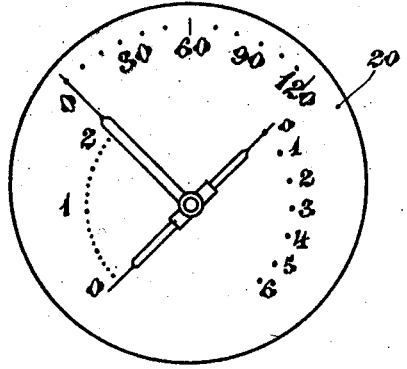
Figs. 3, 4 and 5 show plan views of three forms of the invention each having three scales.
Figure 4:
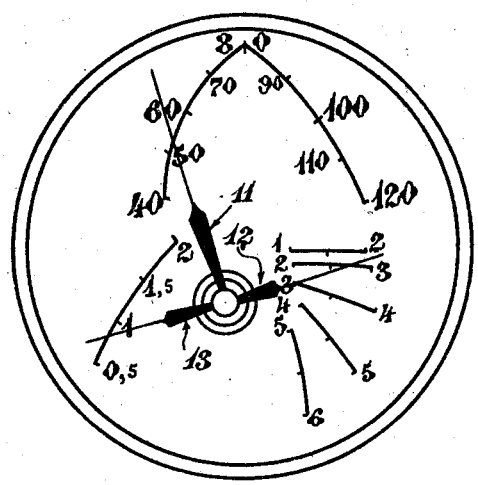

The dial 20 provided with graduations may be as shown in Figs. 3 and 4 for an electromagnetic voltmeter.

In Fig. 3 the scales are divided in known manner over three arcs of the circumferences of circles concentric with the spindle 2. In Fig. 4 the 0–120 volt graduation consist of two curves graduated in units. These curves are the integral curves of the spaces differentiated as will be described hereafter. The 0 to 6 volt graduation is formed of a series of curves of equidistant points. The 0 to 2 volt graduation consists of a single curve graduated with equidistant points.

The 0 to 2 volt graduation is useful for testing individual cells of a battery. In wireless for example, the 0 to 6 volt graduation serves for testing the voltage applied to the valve filaments and the 120 volt graduation, the tension of the battery.

Figure 6:
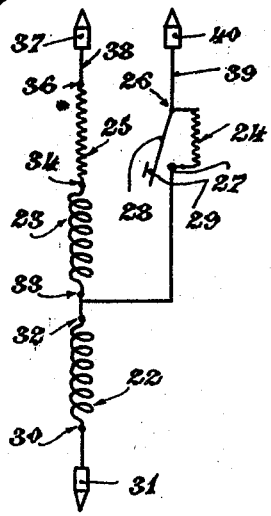
Figs. 6 and 7 show diagrammatically the arrangement of the circuits.
Figure 7:
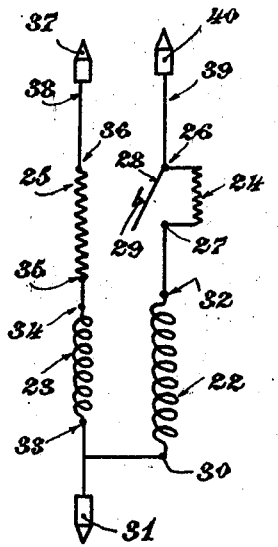
Figure 9:
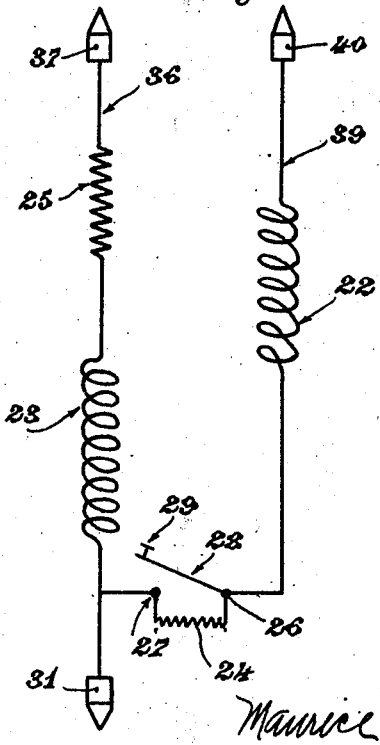

From the circuit diagrams Fig. 6, it is seen that the coil 1 is formed with two windings 22 and 23 corresponding to the extreme tensions. These windings may be connected in series as shown in Fig. 6 or employed separately as shown in Fig. 7. The resistance 24 in series with the winding 22 forms the 0 to 6 volt circuit. The 0 to 120 volt circuit is formed by the windings 22 and 23 and the resistance 25 in series as shown in Fig. 6 or by the winding 23 and the resistance 25 (Fig. 7). The 0 to 2 volt circuit may be formed either through the winding 22 alone or by this winding and an adjustable resistance.

In practice the resistance 24 is short circuited when using the 0 to 6 volt scale. For this purpose the resistance 24 is connected to two terminals 26 and 27. One terminal 26 is affixed to a switch arm 28.

A push button 29 is provided for operating the arm 28 to bring it into contact with the terminal 27. This operation short circuits the resistance 24 and places it on the 0 to 2 range. One end 30 of the coil 22 (0 to 6 volts) is connected to a terminal 31 as shown in Fig. 6. The second end 34 of the coil 23 is connected to one end 35 of the resistance 25. The second end 36 of the resistance 25 is connected by a terminal 37 to the battery. In a voltmeter of the pocket type the terminal 37 consists of a metal point. The connection to the end 36 is made by a flexible cord 38.

The end 32 of the coil 22 and the end 33 of the coil 23 are connected to the terminal 27. A lead 39, having a terminal 40 is connected to the terminal 26. In the pocket type of voltmeter, the lead 39 is a flexible cord and the terminal 40 a metal point.

From the foregoing it is apparent that the terminal 31 is common for all three ranges.

Figure 8:
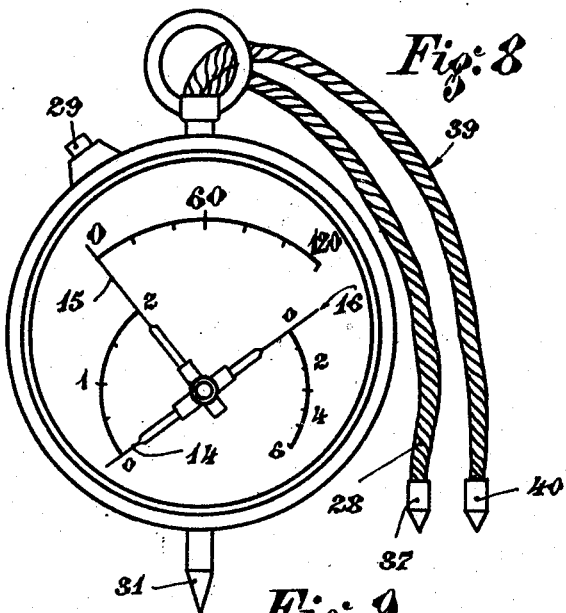
Fig. 8 is a front view of the indicating dial and contact members for a portable voltmeter but employing the usual arrangement for division of the points.

Fig. 8 gives a plan view of the indicating arrangement for a pocket voltmeter having its parts arranged as above described. The graduations are arranged in the ordinary way. A series of auxiliary curves can be employed together with the arcs of circles to represent the scale, these auxiliary curves having equidistant markings. The curves are obtained as will be described hereafter.

The operation of the three scale voltmeter is as follows:—

Measurement of tension between 0 and 120 volts

The terminal 31 brought in contact with one of the terminals of the circuit on test and the point 37 with the second terminal. Current flows through the coils 22 and 23 (Fig. 6) and the adjustable resistance 25.

In the modification shown in Fig. 7 the current does not pass through the coil 22. If an arrangement employing only two integrated curves, as in the case shown in Fig. 4, the pointer 15 gives the value of the test voltage. The units of the higher order are shown by the principal graduated scale. The units of the lower orders are obtained by interpolation and that much more easily, in that the scales are shown following a linear law so that the eye can easily interpret the reduced readings with great accuracy.

This scale of 0 to 120 volts can also be readily shown on two integrated curves in conjunction with a series of auxiliary curves obtained in the same way as the graduation for 0 to 6 volts or by an ordinary circular graduation alone or combined with a series of auxiliary curves.

Measurement of tension between 0 to 6 volts

The point 31 is brought into contact with one of the terminals and the point 40 with the second. The voltage is read on the scale under the pointer 16. In the case shown in Fig. 4 the reading is made on one of the auxiliary curves.

Measurement of tension between 0 and 2 volts

The point 31 is brought into contact with one terminal and the point 40 with the second. The push button 29 is depressed which short circuits the resistance in the 0 to 6 volt circuit and the reading is taken from the scale under the pointer 14. The graduations are calibrated similarly to those for the 0 to 120 volt range.

In the case of moving vane apparatus, a coil (Fig. 10) rotatable between the poles of a permanent magnet (not shown) being displaced proportionately to the voltage of the current applied. A terminal 42 of the coil is connected to the contacting point 31 which is common to all three ranges. To the end 43 of the winding two distinct circuits are connected one comprises a resistance 44, a lead 45 and a contacting point 46. The second comprises a resistance 47 connected between two terminals 48 and 49. A second resistance 50 one end 51 of which is connected to the terminal 49 and the other 52 through a lead 53 to contacting point 54.

A flexible switch arm 55 is connected to the terminal 49. A push button 56 is provided to bring the arm 55 into contact with the terminal 48.

The first circuit is employed for one of the three ranges and the second for the other two.

One of the two latter is obtained by employing the winding 41 in series with the resistances 47 and 50 and the other by employing the winding 41 with the resistance 50 alone, the resistance 47 being short circuited by the arm 55 as described above.

For a voltmeter of the pocket moving vane type, the leads 45 and 54 are flexible cords and the terminals 46 and 54 metal points. The operation is similar to that of the electromagnetic voltmeter.

The production of the various curves will now be described. The rule governing the system employed is ascertained in the case of each range, the angular displacements of the pointer being a function of the terminal voltage applied. This law is as follows:—

$$A = F(B)$$

A denotes the voltage,

B denotes the angular displacement of the pointer relatively to an initial position, F is a continuous function of the variable A considered.

A differential equation is formed for each range:—

$$B^1 - (K^2 \times F^1 - C^2) - 1 = 0$$

in which $B^1$ is the differential of B with respect to C $F^1$ is the derived function of F with respect to B, C the radius vector in co-ordinate pole representation of which the origin is a point coinciding with the needle spindle and the zero ordinate lies along the pointer when in its position of rest.

K is a constant having a value depending on the graduation units.

The resolution of a differential equation of the general form given above can be represented graphically as is well known with great accuracy. If origin (Fig. 12) is represented by $a$ it is found for a given constant that two integral curves $b$ and $c$ exist both passing through a given point $d$. One of these curves $b$ has ascending radius vectors the other descending radius vectors for increasing polar angles.

To obtain graduations two arcs of integral curves of different natures are combined as shown in Fig. 13 which gives an example of a graduation for a maximum angular displacement $d$, $a$, $e$ of the indicating pointer. From the origin $d$ of the scale to the point $f$ an arc of the space curve $b$ (radius vectors ascending with polar angles) is employed. From $f$ to $e$ an arc of the space curve $c$ (radius vectors descending when the polar angle is increased) is employed.

The graduation for 0 to 120 volts Fig. 4 has therefor been established. The arcs of the curves 40 to 80 volts and 80 to 120 volts have been calculated by points. By calculus the co-ordinates of the points 40, 50, 60, 70, 80, 90, 100, 110, 120 volts can be calculated directly or if desired, any other points. In this latter case after having drawn the arcs of the curves they can be divided up into equal parts according to the graduation constant.

This operation is easily done with graduated scales or with curves. The subdivisions of the main points corresponding to units is also readily effected.

For clearness on the drawings the graduation is not carried beyond 40 volts.

The 0 to 6 volt graduation starting above 1 volt is gotten in the same general way as that shown in Figs. 12 and 13. Integral curves are made for each interval 1 to 2, 2 to 3, 3 to 4, 5 to 6 volts to which the scale is limited. The origins 1, 2, 3, 4, 5 of these arcs are respectively situated on the same radius vector as the ends 2, 3, 4, 5, 6 of the arcs. The radius vectors may be constructed with equal endings as shown in Fig. 4. The arcs may be subdivided into ten equal parts each corresponding to one tenth of a volt.

Fig. 14 shows a modification in which the auxiliary integral curves have been chosen in such a way as to give radius vectors ascending with the polar angle. In Fig. 15 on the other hand the arcs are the reverse.

These sets of auxiliary integral curves may be combined with circular arcs giving the main points (points corresponding to units of the higher order) in the usual notation. These are the arcs of auxiliary curves which give the invention novelty by the equal division of the points corresponding to units of the lower order and of the higher order. Figs. 14 and 15 show this modification.

The principal curve may be an integral curve as shown in Fig. 16.

On the scales of the types 14, 15 and 16 the readings are taken from the intersection of the pointer and the principal curves for the units of a higher order and the intersection of the needle and one of the auxiliary curves for those of a lower order.

Returning to Fig. 4 it is seen that the 0 to 6 volt needle shows two volts on the main curve and seven tenths on the auxiliary curve.

The 0 to 2 volt graduation is obtained from a single integral curve giving a tenth of a volt on a scale of two centimeters to a volt. Or may be constructed on any other basis.

In the particular case where the variations are proportional to the angular displacements of the needle (protractors, balances, galvanometers and the like) the integral curves are circles.

For a given constant in general there are two integral circumferences passing through a given point. It may be shown according to the choice of constant that the two circumferences are tangential.

Fig. 18 shows for an angle $g$, $h$, $i$ two pairs of circumferences for the same constant but with different origins. The first pair has an origin $j$ comprising two arcs of circumference $k$ and $l$ tangents to $j$. The circumference $k$ has a centre $h$ the circumference $l$ has a slightly smaller radius. The second pair with an origin $m$ corresponds to the same constant and comprises two arcs having circumferences $n$ and $p$ both passing through the point $h$.

Fig. 16 shows the arrangement of the scale in the case where auxiliary circles are employed. Its reading is similar.

Figure 5:
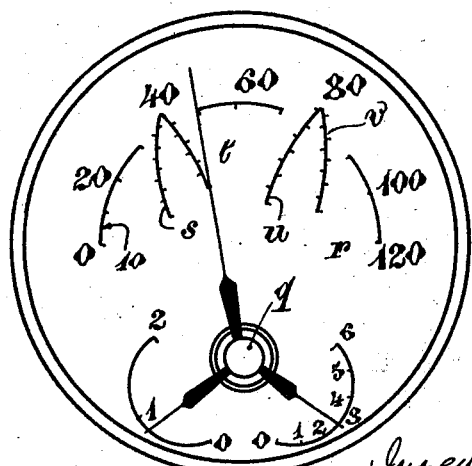

A moving vane voltmeter having an indicator as shown in Fig. 5 and coil connections as in Fig. 10 and is an example of this for three ranges.

The 0 to 2 volt graduations is obtained by employing a semi-circumference passing through an origin $o$ arranged on the needle axis and corresponding with a constant of two centimeters per volt.

The 0 to 6 volt graduation employs a similar semi-circumference but the constant is fifteen millimeters per volt.

The 0 to 120 volt graduation comprises an arc of 180° of a circle $r$. This arc forms the main scale with a constant of eight tenths of a millimetre per volt. As in general in using apparatus for wireless telegraphy accuracy in measuring voltages of 40 to 80 volts is desired, the sensibility of the readings can be increased by drawing in the spaces 30–40 volts 40–50 volts, 70 to 80 volts, 80 to 90 volts arcs having auxiliary circumference $s$, $t$, $u$, $v$.

The arcs $s$ and $u$ corresponding to voltages lower than the critical values are arranged with ascending vectors, the arcs $t$ and $v$ with descending vectors as the voltage rises. The constant of these auxiliary circumferential arcs may be ten millimetres per volt. As the corresponding circumferences pass through a known point to which their origin is fixed they are completely determined and can be constructed from the preceding graphs. In the case of Fig. 5 the three needles constructed as shown in Fig. 2 are calibrated through 120°.

The foregoing apparatus relates to three ranges but similar apparatus may be constructed for one, two or other ranges.

What we claim as our invention and desire to protect by Letters Patent is:—

A voltmeter having a plurality of scales a pointer moving over each scale, a common spindle and an armature carrying the spindle upon which the pointers are mounted, two coils for operating the armature, a resistance in series with each coil, a switch for cutting out one resistance, and means for employing the two coils in series to give three distinct ranges over which the apparatus will indicate sensitively.

In witness whereof we affix our signatures.
PIERRE DUGIT.
AMABLE PIERRE JEAN-MARIE FOULHOUZE.